March 23, 1965     H. A. SCHETNE     3,175,220
STREAMLINED RADOME WITH RIDGED WALLS
TO COMPENSATE FOR BORESIGHT ERROR
Filed April 13, 1955
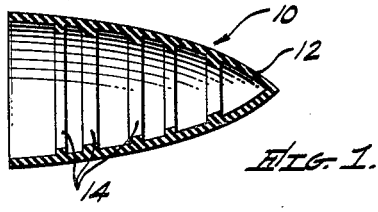
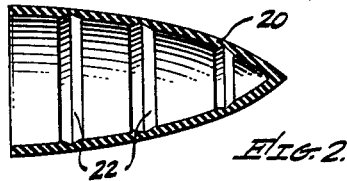
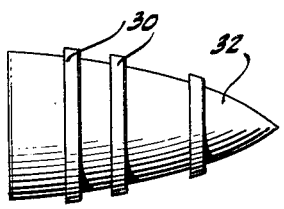
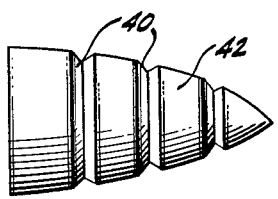
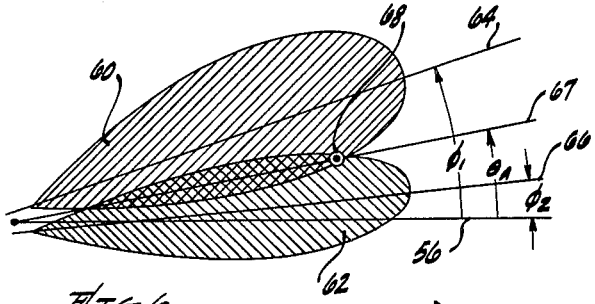
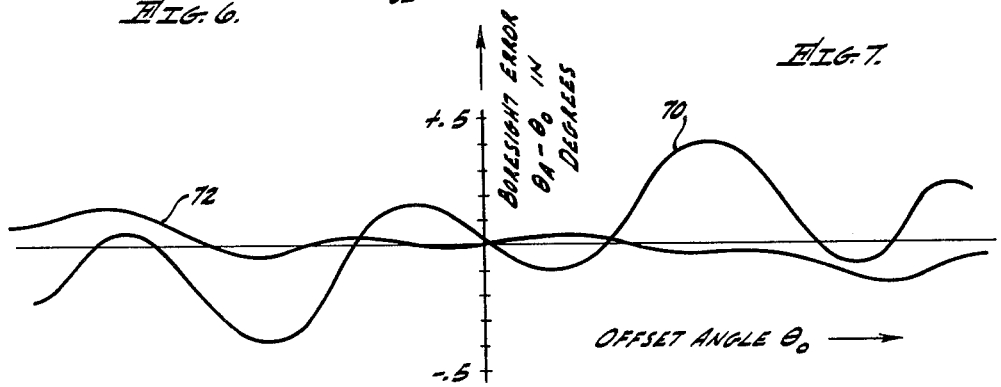
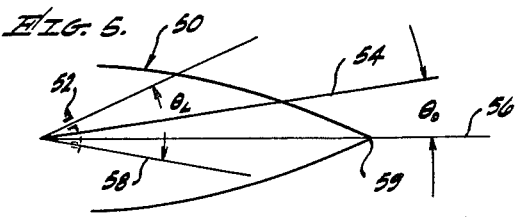
INVENTOR.
HECTOR A. SCHETNE,
BY Henry Heyman
ATTORNEY.

United States Patent Office 3,175,220
Patented Mar. 23, 1965

3,175,220
STREAMLINED RADOME WITH RIDGED WALLS TO COMPENSATE FOR BORESIGHT ERROR
Hector A. Schetne, Redondo Beach, Calif., assignor to Hughes Aircraft Company, Culver City, Calif., a corporation of Delaware
Filed Apr. 13, 1955, Ser. No. 501,109
8 Claims. (Cl. 343—872)

This invention relates to electromagnetic microwave systems and more particularly to an antenna housing for such a system which is transparent to electromagnetic beams.

It is desirable to prevent the refraction and dispersion of an electromagnetic microwave beam by an antenna housing or radome in order to preserve the accuracy of the radar system associated with it. For this reason, the ideal electrical configuration of a radome for a radar system is a hollow sphere. In the absence of other limiting factors, a hemisphere is commonly employed for a radome shape. In aircraft, however, radomes must be streamlined for aerodynamic purposes. Therefore, in radar tracking systems the use of streamlined radomes for the aircraft, in turn, introduces a tracking error called a boresight error. This error is defined as the angle between the true offset axis of the antenna of the system and the apparent offset axis which is determined from the external radiation pattern of the antenna, i.e., from its radiation pattern outside the radome.

It is therefore an object of the invention to provide an improved antenna housing for microwave systems.

It is another object of the invention to provide means for reducing the boresight error of streamlined radomes for aircraft and guided missiles.

In accordance with the invention dielectric means are disposed in the path of an electromagnetic beam to provide discontinuity along the beam path. The beam is then directed through a streamlined radome by lobing antenna means and the refraction and dispersion of the beam produced by the radome is modified by the dielectric means in a manner to reduce or minimize the boresight error of the lobing antenna means.

The novel features which are believed to be characteristic of the invention, both as to its organization and method of operation, together with further objects and advantages thereof, will be better understood from the following description considered in connection with the accompanying drawing in which several embodiments of the invention are illustrated by way of example. It is to be expressly understood, however, that the drawing is for the purpose of illustration and description only, and is not intended as a definition of the limits of the invention.

FIGS. 1 and 2 are sectional views of radomes which illustrate alternative embodiments of the present invention;

FIGS. 3 and 4 are elevational views of two radomes illustrating still other embodiments of the device of the present invention;

FIG. 5 is a schematic view of radiating apparatus which may be employed in practicing the present invention;

FIG. 6 is a graph of radiation patterns typical of those which may be derived from the radiating apparatus shown schematically in FIG. 5; and FIG. 7 is a graph of boresight error as a function of the offset angle naturally present in a streamlined radome and as it exists in a radome in which the device of the present invention is employed.

Referring to the drawing, a radome 10 for a radar system having a streamlined curvature or configuration 12 is shown in FIG. 1. The radome 10 may be made of any of many known compositions. The radome 10 should, of course, be made of a material as substantially transparent to electromagnetic beams as it is physically possible to obtain although it must be mechanically strong to withstand aerodynamic forces.

As stated previously, a hemisphere is the ideal configuration of a radome. In aircraft, however, the use of a streamlined radome often becomes imperative. This is particularly true when the radome is employed in or near the nose of an airborne aircraft moving at a relatively high speed.

Electrically, it is desirable to employ an electromagnetic beam in a radome as small in cross section as possible in order to minimize boresight errors which are introduced by the relatively large variation in the beam angles of incidence at its outer edges. This rule of design is obviously applied in only a limited fashion because radiating structures must be made small enough to be accommodated by the radome.

It is also desirable to make the radius of a radome as large as possible. Its maximum radius, of course, is generally determined by its structural application in aircraft. Specifically, the maximum transverse diameter of a radome should be made approximately to fit the nose of the aircraft in which it is used in order to best satisfy obvious aerodynamic requirements. The thickness of the radome 10 is generally constant and may often be equal to $\lambda/2$ where $\lambda$ is the free space wavelength of the wave of the electromagnetic beam. The curvature 12 of the radome 10 is obviously not limited to that shown in FIG. 1. In aircraft the curvature 12 is generally a compromise between the ideal aerodynamic and electrical contour.

In accordance with the present invention, a plurality of dielectric strips 14 are positioned inside of and contiguous to the radome 10. The strips 14 may be conveniently made of the same material as that of which the radome 10 is made or any other dielectric material such as an impregnated fabric of woven glass fiber. The strips 14 need not necessarily be positioned inside the radome 10. However, this is generally more desirable in reducing air resistance. The strips 14 likewise need not be positioned contiguous to the radome 10 but need only be disposed in the path of the electromagnetic radiation passing through the radome 10. The strips 14 are most easily maintained in an appropriate position when they are secured to the inner surface of the radome 10 with an adhesive. Alternatively, the strips 14 may be sprayed or painted onto the internal surface of the radome 10, in the form of a liquid dielectric mixture having a volatile carrier or suspending medium.

In one particular radome, a suitable strip has been provided having a radial thickness of $0.04\lambda$ and an axial width from $0.25\lambda$ to $0.50\lambda$ although these relative dimensions are not at all critical. The strips 14 are spaced from each other according to an empirical relationship which has not, as yet, been reduced to a practical mathematical formula because the relationship varies with the curvature 12 of the radome 10 and many other factors related to the position, power output, and beam width of the antenna means associated with the radome 10. An unusually effective method of easily determining satisfactory spacings for the strips 14 has been developed. This method is hereinafter set out in detail in relation to the specific problem of compensating for or minimizing boresight error.

Another embodiment of the radome of the present invention is illustrated in FIG. 2 where a radome 20 is shown with a plurality of grooves 22 cut into the internal surface of the radome 20.

The particular cross sections of the strips 14 shown in FIG. 1 or of the grooves 22 shown in FIG. 2, of course, need not be necessarily used. The grooves 22, however, will naturally be positioned differently than the strips 14. The shape and composition of the radome 20 and the shape of the grooves 22 may be similar to radome 10 and to strips 14, respectively, as shown in FIG. 1. Thus, the purpose of both the strips 14 and the grooves 22 is to serve as dielectric means providing transverse electrical discontinuities in the path of travel of an electromagnetic microwave beam passing through the radomes 10 and 20. The strips and grooves, of course, need extend only partially around the circumference of the radome to the extent to which a beam passes through them. Their circular nature merely provides a most desirable symmetry for ease of manufacture.

As stated previously, the strips 14 in FIG. 1 need only be placed somewhere in the path of the electromagnetic beam passing through the radome 10. The possibility of employing dielectric strips on the outside of a radome is illustrated in FIG. 3 where a plurality of dielectric strips 30 are shown disposed about a radome 32. Analogously, grooves may be cut in the external surface of a radome to provide electrical discontinuities. For example, in FIG. 4 a plurality of grooves 40 are shown cut in the external surface of a radome 42. The radomes and strips shown in FIGS. 3 and 4 may have a composition and shape similar to those shown in FIGS. 1 and 2. Likewise, the shape and relative dimensions of grooves 40 shown in FIG. 4 may correspond to those of grooves 22 shown in FIG. 2.

It is unnecessary to provide more than one strip or groove either on the inside or on the outside of a radome to practice the present invention because some boresight error correction may be obtained with the use of a single strip or groove. The use of more than one electrical discontinuity, however, normally produces a substantially better overall correction. The electrical discontinuities may be considered to lie in axially separate regions and to define discrete discontinuities along the axis.

In order to explain the manner in which boresight error correction is obtained by the use of the device of the present invention, it is desirable to more closely examine the nature of the problem. Referring to FIG. 5, a radome surface is indicated by line 50 and a radiation device is indicated schematically by a dipole antenna 52. The antenna 52 is shown scanning about a true line of sight 54. An axis or abscissa 56 of a spatial coordinate system is chosen as shown. The angle, $\theta_0$, between the true line of sight 54 and the abscissa 56 is called the true offset angle. The antenna 52 is shown in its upper lobing position. Its lower lobing position is indicated by a line 58. The angle through which the antenna 52 scans in rotating about the true line of sight 54 is then indicated by $\theta_L$. This is called the scan angle and should be carefully distinguished from the offset angle, $\theta_0$.

Two radiation patterns 60 and 62, which are shown in FIG. 6, may be obtained from antenna means such as dipole antenna 52 disposed at two opposite lobing positions. The dispersion of a beam is actually a result of the refraction by infinitesimal segments of the beam; however, any further reference to the refraction of a beam is intended to refer to the deflection of the central or principal portion or axis of the beam. As indicated in FIG. 6, the radiation patterns 60 and 62 have respective axes 64 and 66 disposed at angles $\phi_1$ and $\phi_2$ with respect to the axis or abscissa 56 which is also shown in FIG. 6.

An apparent look angle as distinguished from the true look axis angle, is indicated by $\theta_A$. The true look angle, $\theta_0$, is the angle the offset axis actually makes with the abscissa 56 or the angle defining the actual mechanical position of the antenna lobing mechanism. The apparent look angle is obtained by drawing a line 67, the apparent axis, through the theoretical point source of radiation and through a point 68 which is the intersection of the boundaries of the radiation patterns 60 and 62 or the crossover point.

When the true and apparent look axis angles differ, a boresight error is said to occur. A non-spherical radome will introduce such an error. The boresight error is then defined as $\theta_A - \theta_0$. A typical boresight error characteristic curve 70 is plotted in degrees in FIG. 7 versus offset angle $\theta_0$ in degrees. It is apparent that in the particular case shown the error is relatively small; e.g., less than 0.5 degree; however, for radar tracking purposes it is often necessary to keep maximum boresight error to about 0.2 degree or less. Furthermore, for other reasons it is necessary to minimize the rate of change of boresight error with respect to the true offset angle.

By practicing the present invention, boresight error may be reduced from an uncorrected error curve such as the curve 70 to a corrected error curve 72 shown in FIG. 7. In order to explain the excellent results which are so easily obtained with the device of the present invention, a proposed general interpretation of the periodic nature of the error curve 70 is given. It is noted that it is the relative refraction and dispersion of the lobing beam at its different lobing positions that determines the magnitude and algebraic sign of the boresight error.

It is submitted that as $\theta_0$ increases the refraction of the beam in the upper lobing position decreases for two reasons. Firstly, the curvature of the surface 50 in the area through which the beam is projected becomes more nearly plane and, secondly, the angle of incidence becomes more normal. For the same reasons the beam in the upper lobing position should have a decreasing dispersion with increasing $\theta_0$. The analysis of the refraction and dispersion of the beam in its lower lobing position is, however, not as simple. As the beam in its lower position approaches the abscissa 56, dispersion increases but refraction does not. This then partially accounts for the oscillatory nature of the curve 70 because the rate of change of both dispersion and refraction are different for different positions of the beam. The periodic nature of the curve 70 can be further explained by the changes in the rate of change of the relative refraction and dispersion of the beam in each of its different lobing positions due to other changes in curvature of the surface 50 in FIG. 5 and the changes in the proximity of the antenna 52 to the surface 50.

All that is necessary to explain the boresight error correction effect of the device of the present invention is that, when appropriately positioned, the electrical discontinuities provided by grooves or dielectric strips modify the refraction and dispersion of the beam in one of its lobing positions to a different extent than they do when the beam is in its opposite extreme lobing position.

The fact that the beam must pass through all material through which it is directed also indicates that the beneficial effect of more than one groove or strip is cumulative. This is actually the case and is, in addition, an advantage in the selection of suitable positions for the grooves or strips. By experimentation with a radome having a given surface configuration, a boresight error curve may be obtained by conventional measuring techniques. A dielectric strip may then be placed in or on the radome at various positions and for each such combination a boresight error curve may be plotted. By subtracting the uncorrected radome error curve from the error curves derived from the radome having the dielectric strip, an error curve for each strip may be found. A similar procedure may be adopted for determining boresight error curves of grooves, although a plurality of identical radomes would, of course, be necessary to obtain an error curve for a radome having more than one groove. A single strip or groove of predetermined dimensions and position will generally have substantially the same error curve in any type of radome. Hence, when either different or identical radome shapes are chosen, a strip or groove having a boresight error curve substantially opposite in sign and equal in magnitude is chosen to reduce boresight error. When the radome error curve is periodic as is usually the case, the use of more than one strip or groove is generally desirable. This is true because a single band usually minimizes only one of the maxima or minima of the uncorrected boresight error curve. However, the selection of a plurality of strips or grooves is extremely simple when strip or groove error curves have previously been obtained. After the error curve of a first strip or groove is added to the initial radome error curve, the sum of the curves may again be treated as an initial radome error curve and another error curve of a strip or groove may be fitted to the composite curve.

It is obvious that the effect of a strip or groove is dependent to a certain extent on both its size and position. Ideal positioning is difficult to estimate although it is to be understood that to reduce the maximum boresight error at a predetermined offset angle, one may predict that a groove or strip must be placed some place on the radome within the area through which the beam is passed as it is scanned through the scan angle $\theta_L$ shown in FIG. 5. Unusually good boresight error corrections may be rapidly made in spite of such a rough indication when the above-described procedure is followed.

What is claimed is:

1. A housing for reducing aberrations and boresight errors of a radar beam passing through the housing comprising: a streamlined dielectric radome forming substantially a surface of revolution about an axis and having a relatively thin wall of substantially uniform thickness, and having more than one axially relatively short axially symmetric dielectric discontinuity spaced in different discrete selected regions along the axis for refracting said radar beam in a manner to substantially eliminate the boresight error otherwise caused by the passage of said radar beam through said radome.

2. A housing for reducing abberations and boresight errors of a radar beam passing through the housing comprising: a streamlined dielectric radome forming substantially a surface of revolution about an axis and having a relatively thin wall of substantially uniform thickness, and having more than one axially and radially thin solid dielectric ring secured axially symmetrically to said surface, to define discrete discontinuities along the axis for refracting said radar beam in a manner to substantially eliminate the boresight error otherwise caused by the passage of said radar beam through said radome.

3. A housing for reducing aberrations and boresight errors of a radar beam passing through the housing comprising: a streamlined dielectric radome forming substantially a surface of revolution about an axis and having a relatively thin wall of substantially uniform thickness, and having more than one axially and radially relatively thin solid dielectric ring secured axially symmetrically to the exterior surface of said radome to provide discretely positioned discontinuities along the axis, for refracting said radar beam in a manner to substantially eliminate the boresight error otherwise caused by the passage of said radar beam through said radome.

4. A housing for reducing aberrations and boresight errors of a radar beam passing through the housing in directions other than along the axis of the housing, the housing comprising: a streamlined dielectric radome forming substantially a surface of revolution about the axis and having a relatively thin wall of substantially uniform thickness, and having more than one axially and radially relatively thin solid dielectric ring secured axially symmetrically to the interior surface of said radome, said rings being disposed at different axial positions along said radome to provide discrete discontinuities for refracting said radar beam in a manner to substantially eliminate the bore sight error otherwise caused by the passage of said radar beam through said radome.

5. A housing for reducing aberrations and boresight errors of a radar beam passing through the housing comprising: a streamlined dielectric radome forming substantially a surface of revolution about an axis and having a relatively thin wall of substantially uniform thickness, and being relieved at separate successive regions along the axis to form more than one axially symmetric groove which is axially relatively short and radially relatively shallow, for refracting said radar beam in a manner to substantially eliminate the boresight error otherwise caused by the passage of said radar beam through said radome.

6. A housing for reducing aberrations and boresight errors of a radar beam passing in varying directions through the housing comprising: a streamlined dielectric radome forming substantially a surface of revolution about an axis and having a relatively thin wall of substantially uniform thickness, and being relieved at a number of separate axial regions to provide more than one axially symmetric groove to define discrete discontinuities in the external surface of said radome, said grooves being axially relatively short and radially relatively shallow, for refracting said radar beam in a manner to substantially eliminate the boresight error otherwise caused by the passage of said radar beam through said radome.

7. A housing for reducing aberrations and boresight errors of a radar beam passing through the housing and scanning in various directions off the axis of the housing and comprising: a streamlined dielectric radome forming substantially a surface of revolution about an axis and having a relatively thin wall of substantially uniform thickness, and being relieved at a number of axially separate regions to form more than one axially symmetric groove defining discrete axial discontinuities in the internal surface of said radome, said grooves being axially relatively short and radially relatively shallow, for refracting said radar beam in a manner to substantially eliminate the boresight error otherwise caused by the passage of said radar beam in different off-axis directions through said radome.

8. A radome for use in a microwave system having a movable antenna effective to lobe a beam of electromagnetic energy in predetermined directions, said radome comprising a shell adapted to completely enclose and seal said antenna from the surrounding atmosphere, the inner and outer surfaces of said shell being substantially uniformly spaced from each other whereby said beam will be propagated through a substantially uniform thickness of said shell irrespective of the direction thereof, a plurality of discrete annular discontinuities disposed on one of said surfaces concentric with the axis thereof at axially separated points whereby at least a portion of said beam may pass through one or more of said discontinuities to substantially eliminate the boresight error which would otherwise occur when said beams pass through said shell.

References Cited by the Examiner

UNITED STATES PATENTS

| 2,607,009 | 8/52 | Affel | 343—872 |
|---|---|---|---|
| 2,617,934 | 11/52 | McMillan et al. | 343—18 |
| 2,639,248 | 5/53 | Overholt | 343—18 |
| 2,659,884 | 11/53 | McMillan et al. | 343—18 |
| 2,674,420 | 4/54 | Johnson | 343—872 |
| 2,814,038 | 11/57 | Miller | 343—872 |
| 2,854,668 | 9/58 | McMillan et al. | 343—18 |

HERMAN KARL SAALBACH, *Primary Examiner.*

CHESTER L. JUSTUS, NOMAN H. EVANS, FREDERICK M. STRADER, *Examiners.*